United States Patent [19]

Mower et al.

[11] 4,119,184
[45] Oct. 10, 1978

[54] AUTOMOTIVE FAN DRIVE ASSEMBLY

[75] Inventors: Michael Lee Mower, Elmira; William Arthur Carleton, Pine City; Gary Richard Packard, Horseheads, all of N.Y.

[73] Assignee: Facet Enterprises, Inc., Tulsa, Okla.

[21] Appl. No.: 793,710

[22] Filed: May 4, 1977

[51] Int. Cl.² .................. F16D 27/10; F16D 43/25
[52] U.S. Cl. .................. 192/82 T; 192/84 C; 123/41.12
[58] Field of Search .................. 192/82 T, 84 C; 123/41.12

[56] References Cited

U.S. PATENT DOCUMENTS

| 3,924,585 | 12/1975 | Woods | 192/84 C X |
| 3,994,379 | 11/1976 | Miller | 192/84 C X |

Primary Examiner—Allan D. Herrmann
Attorney, Agent, or Firm—Remy J. VanOphem

[57] ABSTRACT

An electromagnetically operated engine cooling fan drive assembly is disclosed having a configuration particularly suited for retrofit applications, including a central shaft adapted to be mounted to an existing fan drive flange to be driven thereby. The fan is mounted on a fan hub member rotatably mounted on the central shaft, with a temperature responsive electromagnetic clutch arrangement controlling drive to the fan hub which arrangement includes an inner body keyed to the central shaft, an armature connected by spring connection to the fan hub, and a fixed electromagnetic coil energized by a temperature switch at high engine temperatures and adapted to urge the armature into clutching engagement with the inner body and cause the fan to be rotated. A number of design features are described: an axially compact mounting of the fan hub to enable positioning of the fan within existing shrouding; the fan hub also encloses the magnetic clutch elements to shield the same against the entrance of dirt and other contaminants; special locking tabs which, in the event of electrical failure, can be positioned to mechanically lock together the inner body and fan hub; the inner body and armature do not support the fan in order to reduce the incidence of failure of these elements; an adjustable anti-rotation arm is provided restraining the magnetic coil body against rotation; the magnetic clutch may be assembled and disassembled on the engine allowing a more compact assembly and convenient repairs; a special fan hub bearing washer retainer is described that is locked to the central shaft insuring that bearing failure will not cause rotation of an end bolt which secures the fan hub on the central shaft.

8 Claims, 5 Drawing Figures

AUTOMOTIVE FAN DRIVE ASSEMBLY

BACKGROUND OF THE INVENTION

1. Field of the Invention

This invention concerns clutch controlled automotive type fan drive devices, and more particularly, electromagnetically operated temperature controlled clutching of the drive to the engine cooling fan.

2. Description of the Prior Art

Automotive cooling fans consume significant power, particularly at higher engine speeds where the augmentation of air flow by the fan is not usually necessary for adequate engine cooling. Thus, it has heretofore been recognized that it would be advantageous to provide a fan drive which would disconnect the drive at higher engine speeds, or whenever the engine was being adequately cooled as evidenced by a thermal sensor. Noise levels would also be reduced.

However, the additional expense of these drives has not been offset by the fuel savings until the recent great increases in fuel prices. This situation has created a market for retrofitting such drives particularly for truck applications in which the economics of operation are critical.

Prior art fan devices of this type have suffered from various design deficiencies; particularly in such retrofit applications.

The addition of this fan drive has increased the axial length of the assembly, creating the need for relocation of shrouding, etc., and rendering the device relatively bulky. Installation of the unit may also necessitate a axial clearance for attachment bolts.

In electromagnetic designs, an inner body element is often included which is configured with arcuate slots joined with relatively thin web sections to provide a proper magnetic flux path, and in many designs this element has supported fan or pulley loads, increasing the incidence of failure of this element.

It is an object of the present invention to provide such a controlled operation automotive cooling fan drive which is particularly suited to such retrofit applications and which does not incorporate such design deficiencies as described.

It is a further object to provide such a fan drive which has certain additional advantages as will be described.

SUMMARY OF THE INVENTION

These and other objects of the present invention which will become apparent upon a reading of the following specification, and are achieved by the provision of a fan drive, including a central shaft, mounted to an existing fan drive flange and having a fan hub rotatably mounted thereon. A temperature responsive electromagnetically operated clutch is incorporated which causes a driving connection to be controlably established between the central shaft and the fan hub, and includes an inner body keyed to the central shaft forming a portion of a magnetic flux path together with an armature element mounted to the fan hub by means of a spring connection. A fixed field coil is provided which, upon energization, causes axial movement of the armature against the bias of the spring connection into engagement with the inner body to establish drive to the fan.

The fan drive features a fan hub which has an outer hub extending over the armature and inner body, and a flange located to position the fan outboard of the electromagnetic clutch to provide an axially compact design while creating a shielding of the clutch components.

The inner body is mounted so as not to be required to support the fan so as to reduce the loading and minimize the incidence of failure of this element.

Assembly and disassembly of the clutch elements may be carried out on the engine, saving space and allowing easier repairs.

An emergency clutch lock up arrangement is provided, comprised of a series of tabs which can be repositioned to lock together the inner body and fan hub in the event of electrical failure.

An adjustable length anti-rotation arm assembly is provided for securing the magnetic field coil housing against rotation.

A special washer is provided cooperating with an end bolt to retain the fan hub bearing on the central shaft which washer serves to prevent the bearing from unscrewing the end bolt in the event of bearing failure.

DETAILED DESCRIPTION

Figure 1:
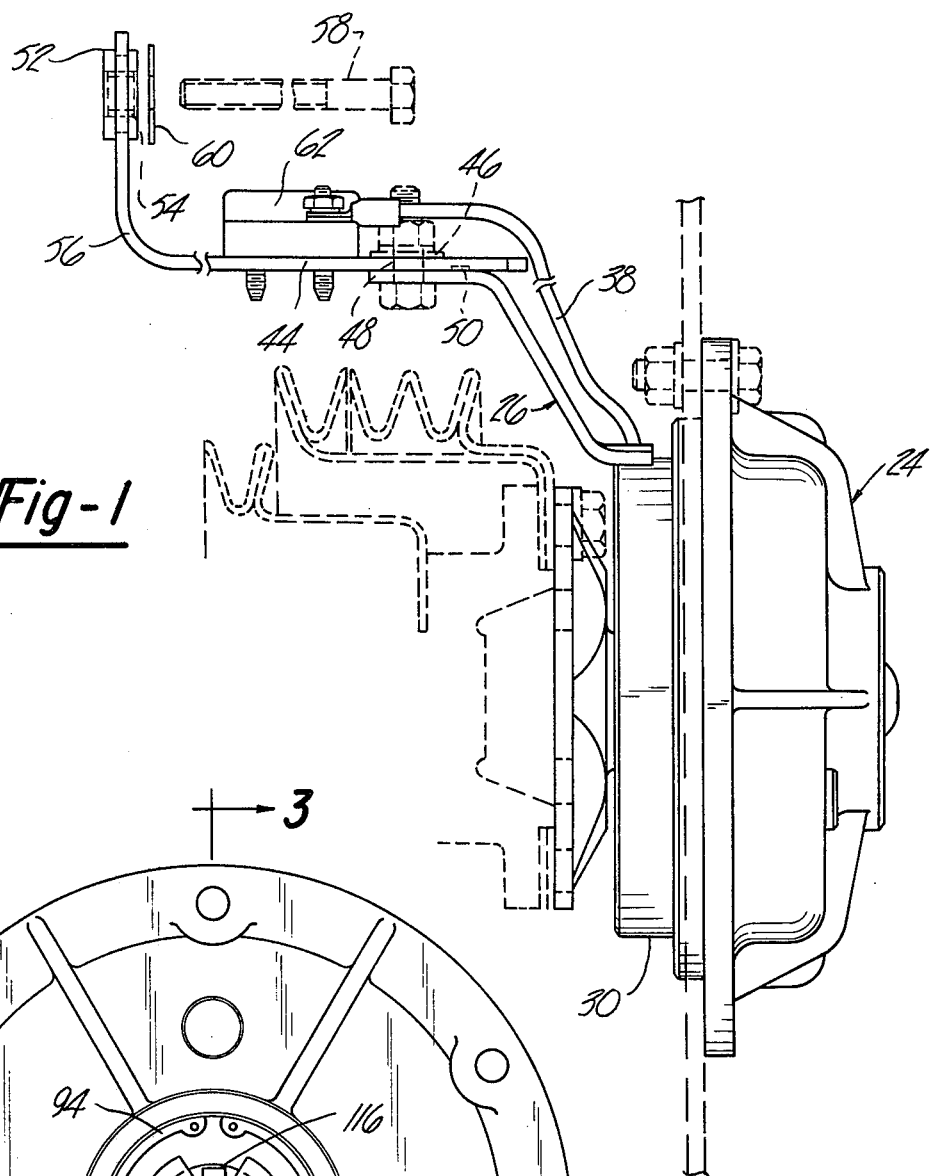
FIG. 1 is a side elevational view of the fan drive according to the present invention, with portions of the engine shown in phantom.
Figure 2:
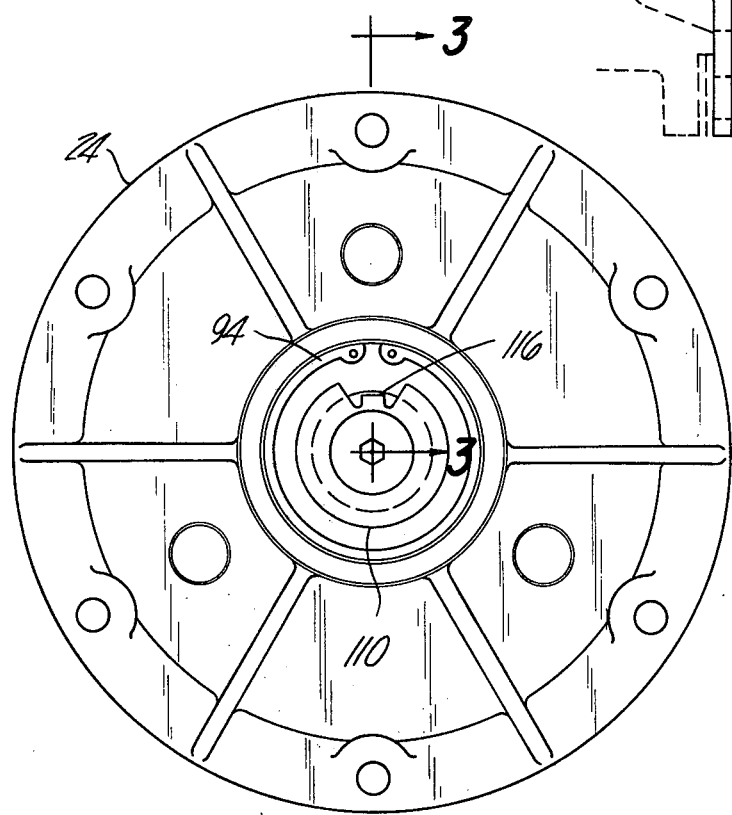
FIG. 2 is a front elevational view of the fan drive shown in FIG. 1.
Figure 3:
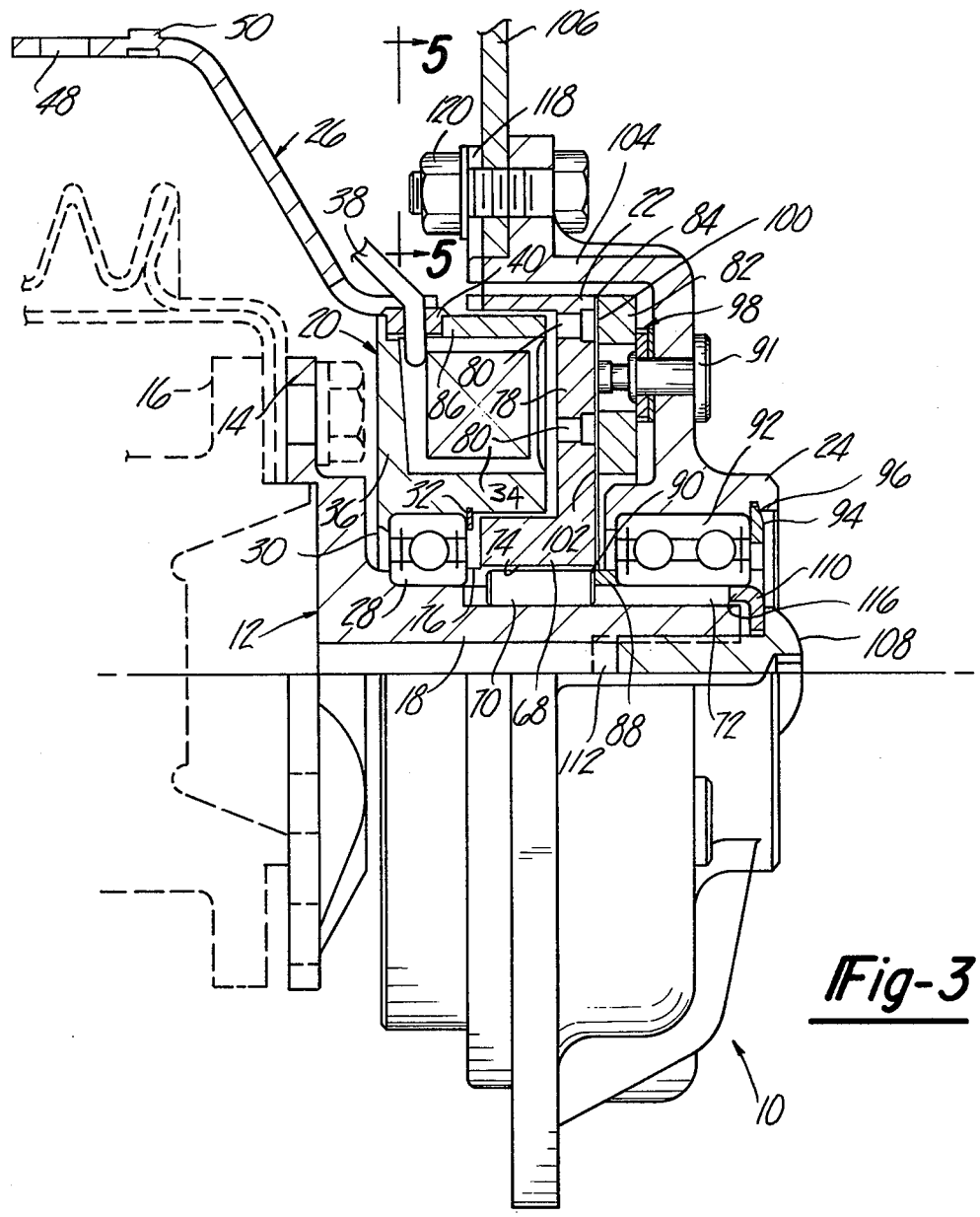
FIG. 3 is a partially sectional view of the fan drive assembly shown in FIGS. 1 and 2.

In the following specification and claims, certain specific language will be utilized and a specific embodiment described in accordance with 35 U.S.C. 112, but it is to be understood that the same is not intended to be limited and should not be so construed inasmuch as the invention is capable of taking many forms and variations within the scope of the appended claims.

Referring to the drawings, the fan drive assembly 10 includes a central shaft 12, having a flange portion 14 to be mounted to the original fan drive hub 16 by a plurality of axially extending bolts and lock washers (shown in phantom).

The central mounting shaft 12 also includes an extension portion 18 on which are rotatably mounted a field coil housing 20, an axially adjacent annular inner body 22, and a fan mounting hub 24.

The field coil housing 20 is restrainged against rotation by an anti-rotation arm assembly 26 secured thereto, and is rotationally supported by anti-friction bearing 28, pressed into coil hub 30 and retained with snap ring 32.

A field coil 34 is mounted within a coil cavity 36 formed in the coil hub 30, with the coil leads 38 extending through the grommet 40 and extending along the anti-rotation arm assembly 26.

The anti-rotation arm assembly 26 includes a first arm welded to the coil hub 30 and a second arm 44 bolted to the first arm through a slot 46 formed in the second arm and a hole 48 formed in the first arm, a locating pilot 50 integral therewith serving to stabilize the second arm 44. The slot 46 allows considerable adjustment for adaptation to various engine configurations.

A grommet 52 with a stop sleeve 54 is provided in the upper portion 56 of the second arm 44 as an anti-vibration mount via bolt 58 and washer 60 to secure the assembly to the engine.

Figure 4:
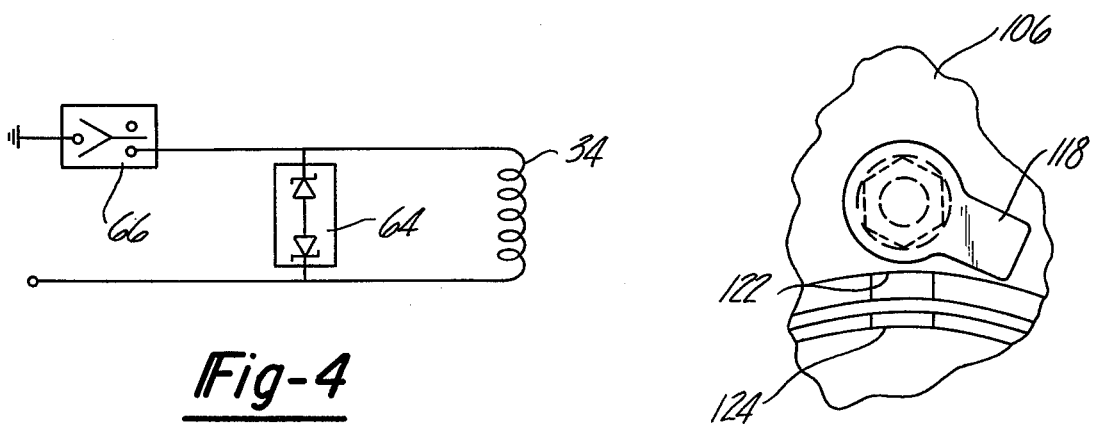
FIG. 4 is a simplified schematic representation of the control circuit for the electromagnetic clutch.
Figure 5:
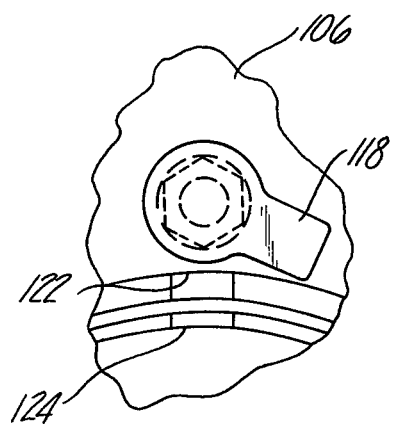
FIG. 5 shows a locking tab in its unlocked position.

A diode terminal block 62 is mounted to an upper surface of the second arm 44 for making electrical connections, the diode 64 (FIG. 4) preventing sharp voltage spikes upon switching of a temperature responsive switch 66. The temperature responsive switch 66 serves to energize the coil 34 upon reaching a predetermined temperature corresponding to the engine temperature.

The inner body 22 includes an inner hub 68 rotationaly fixed on the central shaft 12 while being axially movable thereon by a key 70 disposed in a keyway 72 formed in the central shaft 12 as well as a keyway 74 formed in the inside diameter of the inner hub 68.

A lip 76 of inner hub 68 abuts the bearing 28 inner race serving to maintain its axial position.

The inner body 22 also includes a radial face portion 78 having kidney-shaped circumferentially extending slots 80 which, by minimizing the radial flux, will serve to guide the magnetic flux from coil 34 into an armature 82 across an air gap 84 as will be described.

The inner body 22 also has an outer hub portion 86 extending over the coil 34 providing a magnetic flux path likewise guiding the flux into the armature element 82.

The inner body is thus manufactured from a magnetically permeable material such as steel.

The axial position of the inner body 22 relative to the armature element 82 is maintained by a spacer 88 abutting the outside axial face 90 of the inner body 22. In turn the spacer 88 is axially located by a bearing 92 rotatably supporting the fan hub 24 and the central shaft 12, and retained with a snap ring 94 within a bore 96.

the annular armature 82 is axially adjacent to the inner body 22, spaced from the field coil 34 and connected to the fan hub 24 by spring connection means 98 riveted to both the fan hub 24 at 91 and the armature element 82 so as to allow limited axial movement against the bias of the spring connection means to bring the armature clutch face 100 into engagement with the clutch face 102 of the inner body 22 under the influence of the magnetic field upon energization of the coil 34. Clutch faces 100 and 102 provide clutch engagement means creating a driving engagement between the inner body and the armature.

The spring elements 98 return the armature element 82 out of engagement with the inner body 22 upon de-energization of the coil 34.

The fan hub 24 has an outer drum portion 104 which extends over the various clutch elements to shield the same.

The fan 106 is attached by means of a fan mounting flange to the outer drum 104 outboard of the electromagnetic clutch to provide an axially compact design, and allow position of the fan 106 within the original shrouding.

The fan hub 24 and the remainder of the clutch elements are maintained in position on the central shaft 18 by means of an end bolt 108 and a special washer 110. End bolt 108 is received in a threaded bore 112 on the central shaft 18 and special washer 110 engages the bearing 92 to axially position the bearing 92 (and thereby the entire clutch assembly) with respect to the central shaft 18.

The special washer 110 is hardened to provide a thrust bearing surface in the event the bearing 92 freezes and begins to rotate on the central shaft 18 and, by a tab 116 extending into the keyway 72, is prevented from rotating with the bearing to effectively prevent an unscrewing force from being transmitted to the end bolt 108, thus obviating loosening and sudden disassembly of the clutch and fan 106.

An emergency mechanical back-up option is provided by virtue of a plurality of locking tabs 118 carried by bolts secured by nuts 120 used to secure the fan 106 to the fan hub 24, which may be repositioned in notches 122 in the fan hub 24, and notches 124 in the outer hub portion of the inner body 22 to create a locked condition of the clutch independently of the clutch.

The clutch may be removed from the central shaft 12 by releasing the anti-rotation arm assembly 26, and removal of the end bolt 108, then sliding the axially movable inner body 22, the field coil housing 20, and the fan hub 24 from the central shaft 12. It can also be assembled separately, thus allowing minimal clearance between the central shaft for the attachment bolts, minimizing the axial length of the assembly.

It can be seen from this description that the objects of the present invention have been achieved by this design, since the design deficiencies of the prior art have been corrected and, in addition, many significant design advances have been provided.

A mechanical emergency lock-up reduces the incidence of disabling failures, since with only a screwdriver, an operator may re-establish the fan drive, enabling the vehicle to be operated pending repairs.

The fragile inner body is not loaded with pulley belt or fan loads, reducing the incidence of failure of this critical element.

The axial length of the assembly is minimal, and the fan location is such as to adapt the unit to existing shrouding, radiator locations, etc., while the adjustable nature of the anti-rotation arm adapts the unit to a wide variety of engine configurations.

The clutch components are effectively shielded by the fan hub outer drum which provides the outboard fan location.

Assembly and disassembly of the clutch components may be carried out separately from the central shaft mounting, further reducing the axial length of the unit, and rendering repairs more convenient.

Finally, the special washer design prevents the possibly disasterous results of bearing failure by preventing loosening of the fan hub.

While only the preferred embodiment of the invention has been disclosed, it will be apparent to those skilled in the art that changes may be made to the invention as set forth in the appended claims and, in some cases, certain features of the invention may be used to advantage without corresponding use of other features. Accordingly, it is intended that the illustrative and descriptive materials herein be used to illustrate the principles of the invention and not to limit the scope thereof.

What is claimed is:

1. An automotive engine fan drive assembly adapted to be driven by an engine fan drive hub, said assembly comprising:

a central shaft adapted to be fixed to said fan drive hub driven by the engine;

a field coil housing rotatably mounted on said central shaft;

a field coil disposed within said field coil housing;

anti-rotation means securing said field coil housing against rotation;

circuit means for controlably energizing said field coil;

a magnetically permeable annular inner body drivingly connected to said central shaft, said inner body element axially adjacent to said field coil and having circumferential slots minimizing the magnetic flux from said field passing radially through said inner body;

a magnetizable annular armature axially adjacent said inner body, spaced from said field coil;

a fan hub assembly including a fan hub, and bearing means rotationally mounting said fan hub on said central shaft adjacent to said armature;

means releasably securing said fan hub on said central shaft;

spring connector means connecting said fan hub to said armature, said spring connector means allowing limited axial movement of said armature towards said inner body against the resistance of an axial bias force, said axial movement occurring under the influence of said magnetic flux;

clutch engagement means producing a driving connection between said inner body and said armature upon said axial movement of said armature;

a fan;

means mounting said fan to said outer hub portion;

said fan hub including an outer hub portion extending over said armature and inner body whereby said armature and inner body are shielded by said outer hub portions.

2. The fan drive assembly according to claim 1 wherein said fan hub outer hub portion includes a fan mounting flange radially outboard of said inner body, whereby the axial length of said assembly is minimized.

3. The fan drive assembly according to claim 2 wherein said inner body includes an outer hub having an end portion in approximate axial alignment with said outer hub fan mounting flange;

said outer hub end portions of said inner body and said outer hub of said fan hub formed with a plurality of circumferentially spaced axial extending slots; and said means mounting said fan carries a plurality of locking tabs carried about said mounting flange at a circumferential spacing corresponding to said spacing of said slots, said tabs being rotatable to be disposed in said slots to establish lock up of said inner body and said fan hub, whereby said fan hub is driven by said central shaft.

4. An automotive engine fan drive assembly adapted to be driven by an engine fan drive hub, said assembly comprising;

a central shaft adapted to be fixed to said fan drive hub driven by the engine;

a field coil housing rotatably mounted on said central shaft;

a field coil disposed within said field coil housing;

anti-rotation means securing said field coil housing against rotation;

circuit means for controlably energizing said field coil;

a magnetically permeable annular inner body drivingly connected to said central shaft, said inner body axially adjacent to said field coil and having circumferential slots minimizing the magnetic flux from said coil field passing radially through said inner body element;

a magnetizable annular armature axially adjacent said inner body, spaced from said field coil;

a fan hub assembly including a fan hub, and bearing means rotationally mounting said fan hub on said central shaft adjacent to said armature;

means releasably securing said fan hub on said central shaft;

spring connector means connecting said fan hub to said armature, said means allowing limited axial movement of said armature towards said inner body against the resistance of an axial bias force under said axial movement occurring under the influence of said magnetic flux;

clutch engagement means producing a driving connection between said inner body and said armature upon said axial movement of said armature;

said inner body, said field coil housing, and said fan hub all being axially slidable on said central shaft upon release of said anti-rotation means and said means releasably securing said fan hub on said central shaft to allow removal thereof without disassembly of said central shaft from said engine drive hub.

5. The automotive fan drive assembly according to claim 4 wherein said central shaft includes a flange portion and wherein said means connecting said central shaft to said engine drive hub includes a plurality of axially extending bolts passing through said flange.

6. An automotive engine fan drive assembly adapted to be driven by an engine fan drive hub, said assembly comprising:

a central shaft adapted to be fixed to said engine fan drive hub driven by the engine;

a field coil housing rotatably mounted on said central shaft;

a field coil disposed within said field coil housing;

anti-rotation means securing said field coil housing against rotation;

circuit means for controlably energizing said field coil;

a magnetically permeable annular inner body drivingly connected to said central shaft, said inner body axially adjacent to said field coil and having circumferential slots minimizing the magnetic flux from said field coil passing radially through said inner body;

a magnetizable annular armature axially adjacent said inner body, spaced from said field coil;

a fan hub assembly including a fan hub, and bearing means rotationally mounting said fan hub on said central shaft adjacent to said armature;

means releasably securing said fan hub on said central shaft;

spring connector means connecting said fan to said armature, said spring connector means allowing limited axial movement of said armature towards said inner body against the resistance of an axial bias force, said axial movement occurring under the influence of said magnetic flux;

clutch engagement means producing a driving connection between said inner body and said armature upon said axial movement of said armature;

said means releasably securing said fan hub to said central shaft including an end bolt threadably engaging the end of said central shaft and further including a retainer washer engaging said fan hub bearing means adjacent said end bolt, and means securing said retainer washer against rotation relative to said central shaft.

7. The automotive fan drive assembly according to claim 1 wherein said circuit means includes a temperature responsive switch controlling energization of said field coil, whereby said fan drive is temperature controlled.

8. The automotive fan drive assembly according to claim 7 wherein said anti-rotation means includes an adjustable length anti-rotation arm assembly secured to said field coil housing.

* * * * *

UNITED STATES PATENT AND TRADEMARK OFFICE
CERTIFICATE OF CORRECTION

PATENT NO. : 4,119,184

DATED : October 10, 1978

INVENTOR(S) : Michael Lee Mower, Arthur Carleton, and Richard Packard

It is certified that error appears in the above-identified patent and that said Letters Patent are hereby corrected as shown below:

Column 1, line 32, delete the word "a" and insert therefor the word ----an----.

Column 3, line 36, delete the word "the" and insert therefor the word ----The----.

Column 3, line 62, delete the word "on" and insert therefor the word ----in----.

Column 6, line 55, after the word "fan" insert the word ----hub----.

Signed and Sealed this

Sixth Day of February 1979

[SEAL]

Attest:

RUTH C. MASON
*Attesting Officer*

DONALD W. BANNER
*Commissioner of Patents and Trademarks*